US006485242B1

(12) United States Patent
Kikawa et al.

(10) Patent No.: US 6,485,242 B1
(45) Date of Patent: Nov. 26, 2002

(54) CONSTRUCTION FOR CLOSING A THROUGH HOLE IN A MAGNESIUM ALLOY CASE

(75) Inventors: Kazuo Kikawa, Saitama (JP);
Shigekazu Tanaka, Saitama (JP);
Kazuhiro Washizu, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/655,474

(22) Filed: Sep. 5, 2000

(30) Foreign Application Priority Data

Sep. 3, 1999 (JP) .......................................... 11-249737

(51) Int. Cl.$^7$ .......................... B65D 39/08; F16B 33/00
(52) U.S. Cl. ......................................... 411/369; 184/1.5
(58) Field of Search ................................... 411/368, 369, 411/370, 531, 542; 184/1.5; 251/144, 264, 216

(56) References Cited

U.S. PATENT DOCUMENTS

| | | | | |
|---|---|---|---|---|
| 2,639,832 | A | * | 5/1953 | Bergstrom |
| 4,177,999 | A | * | 12/1979 | Raber |
| 5,183,267 | A | * | 2/1993 | Ackerman |
| 5,188,495 | A | * | 2/1993 | Jones |
| 5,409,337 | A | * | 4/1995 | Muyskens |
| 5,547,042 | A | * | 8/1996 | Platt |
| 6,173,969 | B1 | * | 1/2001 | Stoll |

FOREIGN PATENT DOCUMENTS

| | | |
|---|---|---|
| DE | 3618296 A1 | 12/1987 |
| DE | 3729603 | 3/1989 |

OTHER PUBLICATIONS

German Office Action dated Apr. 11, 2001.
Translation of the German Office Action dated Apr. 11, 2001.

* cited by examiner

*Primary Examiner*—Flemming Saether
(74) *Attorney, Agent, or Firm*—Arent Fox Kintner Plotkin & Kahn (57) ABSTRACT

A construction is provided in which a drain hole 4 provided with internal threads 3 in a Mg alloy oil pan 1 is closed with a screw-type plug body 5 constituted by a metal other than Mg and Mg alloy. The plug body 5 has a threaded shank 6 screwed into the drain hole 4 and an enlarged end 7 having a diameter larger than that of the threaded shank 6. A corrosion preventing plate 14 fitted on the threaded shank 6 via a threaded shank passing hole 15 is disposed between a washer 11 of the enlarged end 7 and a peripheral portion 13 of an opening of the drain hole 4 which corresponds to the washer 11 so that there is provided an electrical insulation between the washer 11 and the peripheral portion 13 of the opening. The corrosion preventing plate 14 has a plurality of annular sealing projections on both sides thereof which are arranged in a concentric fashion about the threaded shank passing hole 15 so as to bite into the peripheral portion 13 of the opening and the washer 11.

9 Claims, 7 Drawing Sheets

CONSTRUCTION FOR CLOSING A THROUGH HOLE IN A MAGNESIUM ALLOY CASE

BACKGROUND OF THE INVENTION

The present invention relates to a construction for closing a through hole in a Mg alloy case.

Conventionally, an oil pan for an engine as a case is formed of Al alloy or steel, and a drain hole, which is a through hole in the oil pan which is provided with internal threads, is closed with a screw type steel plug.

The idea of constructing oil pans of Mg alloy has resulted from increasing demands for lighter oil pans. However, if the aforesaid closing means is adopted for a Mg oil pan, since the Mg alloy is located on the lowest potential side of a corrosion potential range and rain water tends to easily collect at a peripheral portion of an opening of the drain hole while running, the peripheral portion of the opening becomes anode from a relationship with the material of the plug and gets corroded.

SUMMARY OF THE INVENTION

With a view to reducing further the weight of the case, an object of the invention is to construct the case of Mg alloy and to provide a construction for closing a through hole in the Mg alloy case which can securely avoid corrosion at the peripheral portion of the opening of the through hole in the case.

With a view to attaining the above object, according to the invention, there is provided a construction for closing a through hole in a Mg alloy case in which the through hole in the Mg alloy case which is provided with internal threads is closed with a screw type plug body formed of a metal other than Mg and Mg alloy, the construction being characterized in that the plug body has a threaded shank screwed into the through hole and an enlarged end having a diameter greater than that of the threaded shank, and that a corrosion protecting plate fitted on the threaded shank via a threaded shank passing hole is disposed between the enlarged end and a peripheral portion of an opening of the through hole which corresponds to the enlarged end so that the enlarged end and the peripheral portion of the opening are electrically insulated, the corrosion protecting plate having a plurality of annular sealing projections on both sides thereof which are concentrically disposed about the threaded shank passing hole so as to bite into the peripheral portion of the opening and the enlarged end.

As is described above, when the enlarged end of the plug body and the peripheral portion of the opening of the through hole are electrically insulated from each other with the corrosion protecting plate, even if rain water collects around the corrosion protecting plate, since the peripheral portion of the opening is prevented from becoming anode, the peripheral portion of the opening can be prevented from corrosion.

Additionally, since there is provided secure sealing between the peripheral portion of the opening and the corrosion protecting plate, as well as between the enlarged end and the corrosion protecting plate through the biting engagement of the plurality of annular sealing projections, the intrusion of water into the through hole is prevented, whereby the corrosion of the internal threads of the through hole can be avoided. Although it is natural to happen, the sealing construction can securely prevents the leakage of the contents of the case to the outside thereof.

DETAILED DESCRIPTION OF THE PREFERRED EMBODIMENTS

In a first embodiment shown in FIGS. 1 to 4, an oil p an 1 for an engine as a case is constructed of Mg alloy (for example, JIS MD1D) and has a drain hole 4 as a through hole provided with internal threads 3 in a lower portion of a side wall 2, and the drain hole 4 is closed with a screw type plug body 5 constructed of a metal other than Mg and Mg alloy.

Figure 1:
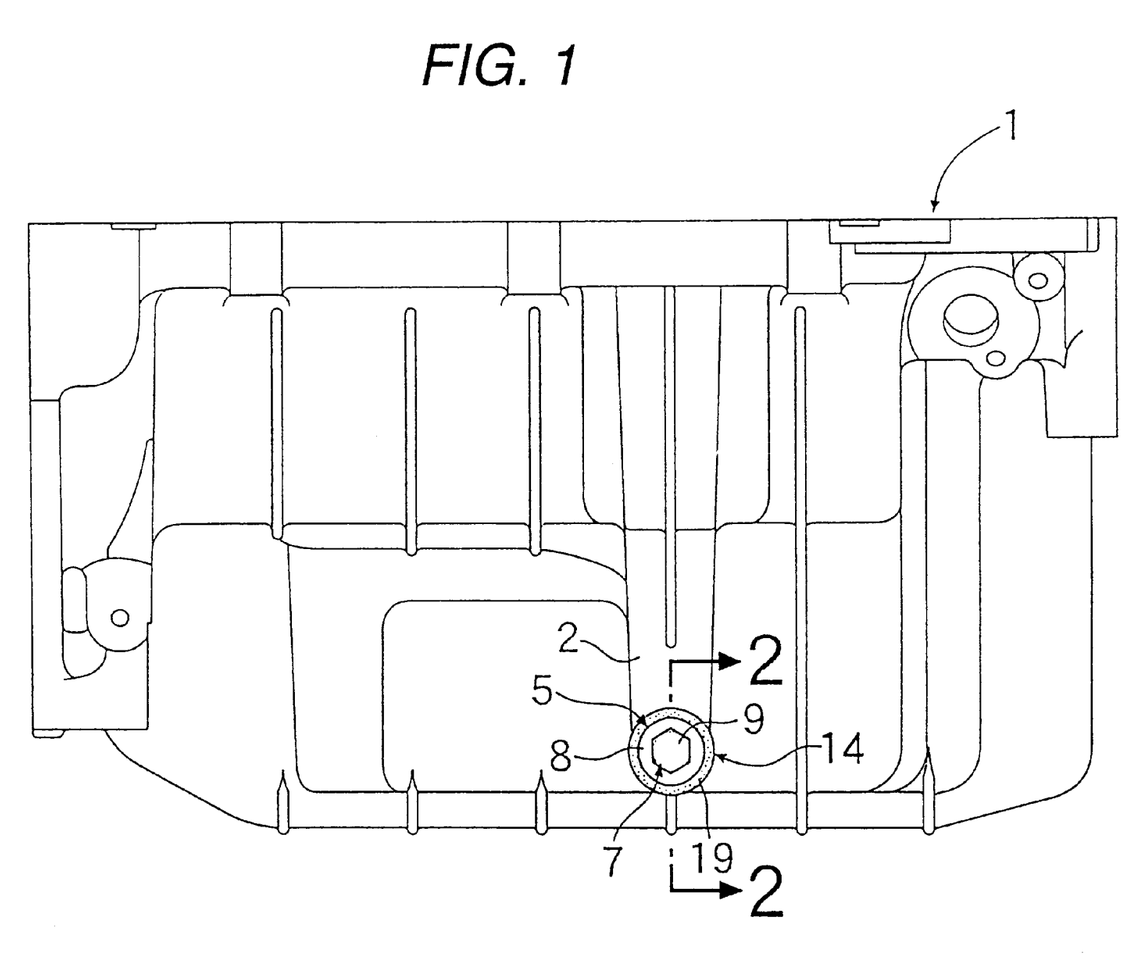
FIG. 1 is a side view of a Mg alloy oil pan for an engine to which a first embodiment of the invention is applied.
Figure 2:
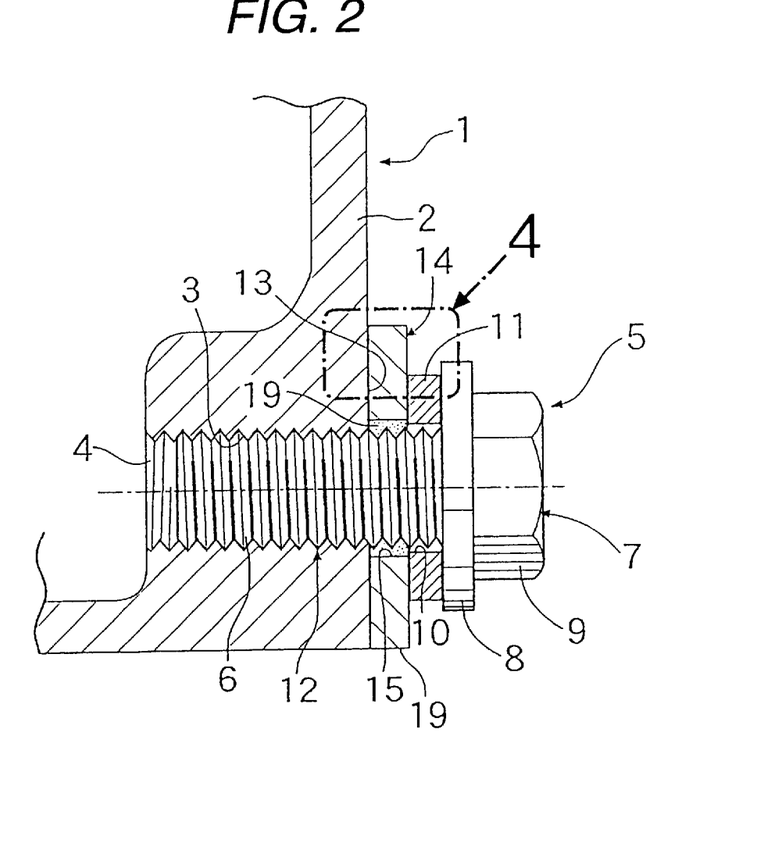
FIG. 2 is an enlarged sectional view taken along the line 2—2 of FIG. 1.

The plug body 5 has a threaded shank 6 screwed into the drain hole 4 and an enlarged end 7 having a diameter larger than that of the threaded shank 6. The enlarged end 7 is integral with the threaded shank 6 and has a hexagonal head 9 having a seat 8 and a washer 11 which is fitted on the threaded shank 6 via a threaded shank passing hole 10 so as to overlap with the seat 8. The threaded shank 6 and the hexagonal head 9 constitute a bolt 12, which is constructed of steel (for example, JIS SWRCH 10) and has a Zn-plated coating on the entire surface thereof. The washer is constructed of Al alloy (for example, JIS Al 100) or pure Al.

An annular corrosion protecting plate 14 is fitted on the threaded shank 6 via a threaded shank passing hole 15 therein so as to be disposed between the washer 11 of the enlarged end 7 and a peripheral portion 13 of an opening of the drain hole 4 to thereby provide an electrical insulation between the washer 11 and the peripheral portion 13 of the opening. Additionally, as is clearly shown in FIGS. 3 and 4, the corrosion protecting plate 14 has on both annular sides thereof a plurality of annular sealing projections 16 arranged in a concentric fashion about the threaded shank passing hole 15, and the respective annular sealing projections 16 bite into the peripheral portion 13 of the opening and the washer 11.

Figure 3:
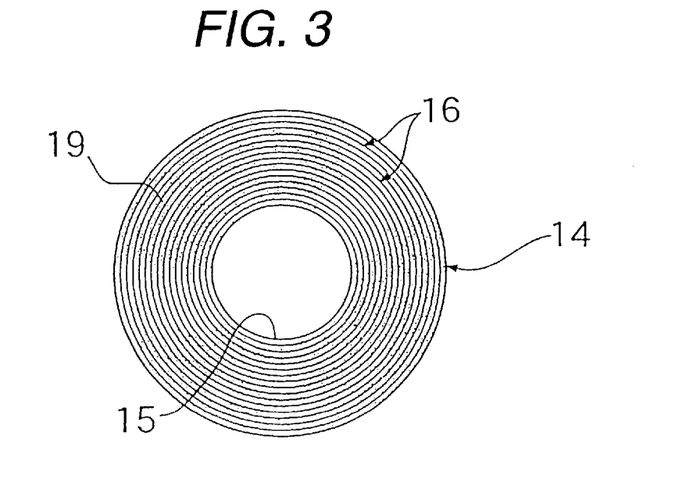
FIG. 3 is a plan view of a corrosion protecting plate.
Figure 4:
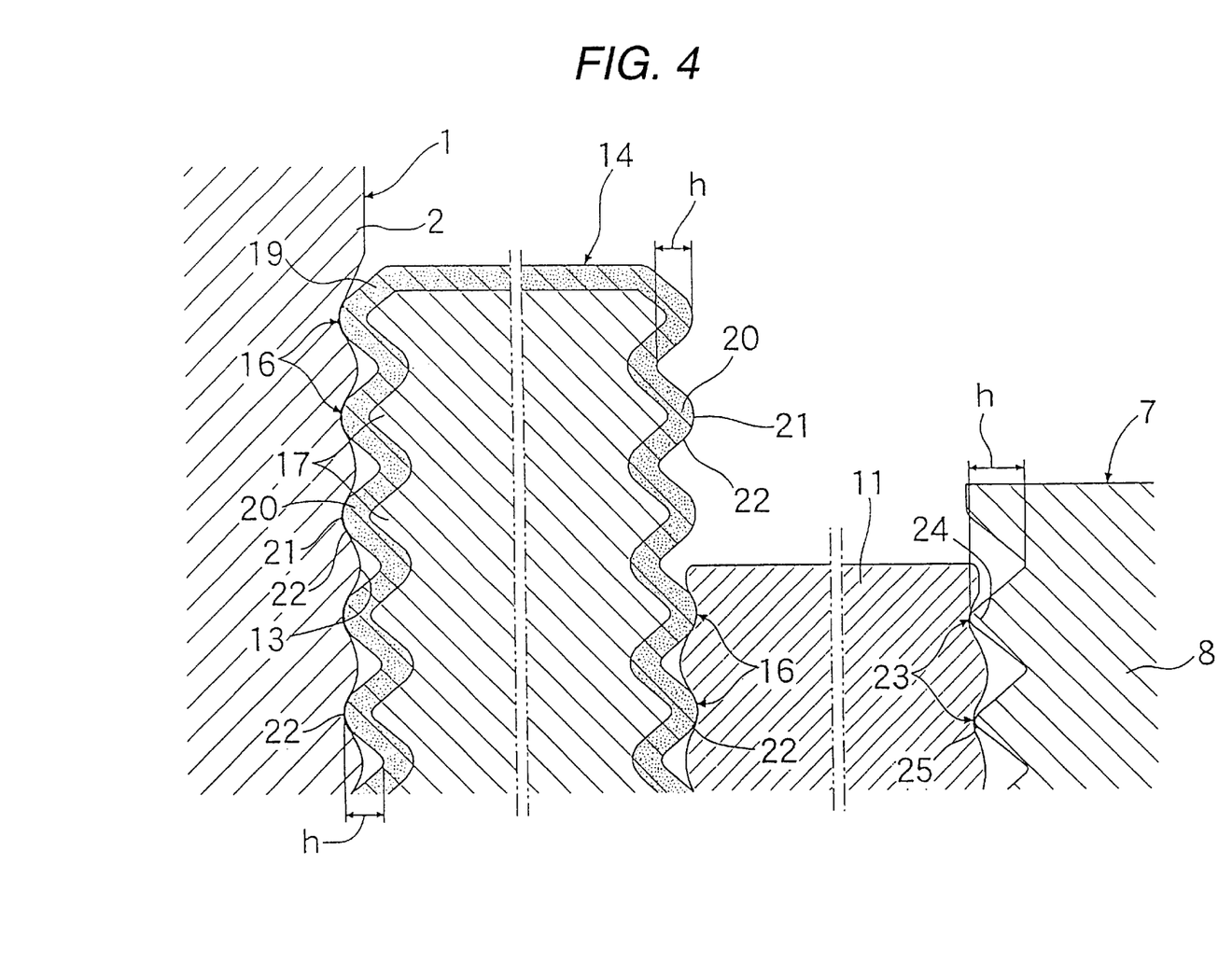
FIG. 4 is an enlarged view of a portion designated by an arrow 4 in FIG. 2.

The corrosion protecting plate 14 is constructed of Al alloy (for example, JIS A5182) and the entire surface thereof is covered with a hard anodic oxidation film 19 formed thereon which is imparted a hole sealing treatment and is about 10 $\mu$m thick, and a ridgeline portion 20 of the respective annular sealing projections 16 has a convex arc-shaped contour 22 at a cross-section intersecting with a ridgeline 21 thereof.

In addition, as is clearly shown in FIG. 4, a plurality of annular sealing projections 23 are provided in an annular side of the washer 8 of the enlarged end 7 which faces the washer 11, the plurality of annular sealing projections 23 being arranged in a concentric fashion about the threaded shank 6, and those annular sealing projections 23 bite into the washer 11. The respective annular sealing projections 23 are formed through machining, whose ridgeline portions 24 each have an acutely angular contour 25 at a cross-section similar to that described above.

The convex arc-shaped contour 22 provided on the ridgeline portion 20 of each annular sealing projection 16 of the corrosion preventing plate 14 is obtained by providing an anodic oxidation treatment to the ridgeline portions each having the aforesaid acutely angular contour 25.

When the electric insulation is effected between the washer 11 of the plug body 5 and the peripheral portion 13 of the opening of the drain hole 4 as described above, even if rain water collects around the corrosion preventing plate 14, since the peripheral portion 13 of the opening is prevented from becoming anode, the peripheral portion 13 of the opening is prevented from getting corroded.

Additionally, since there is provided secure sealing between the peripheral portion 13 of the opening and the corrosion preventing plate 14, as well as between the washer 11 and the corrosion preventing plate 14 through the biting engagement of the pluralities of annular sealing projections 16, 23, the intrusion of water into the drain hole 4 is prevented, thereby making it possible to avoid the corrosion of the internal threads 3 of the drain hole 4. Although it is natural, the leakage of oil to the outside can securely be prevented through the above sealing construction. The heights h of the respective annular sealing projections 16, 23 are $h \geq 5\,\mu m$, preferably, $10\,\mu m \leq h \leq 30\,\mu m$. In this case, with heights being $h < 5\,\mu m$, the aforesaid sealing effect cannot be obtained sufficiently.

Figures 5A, 5B:
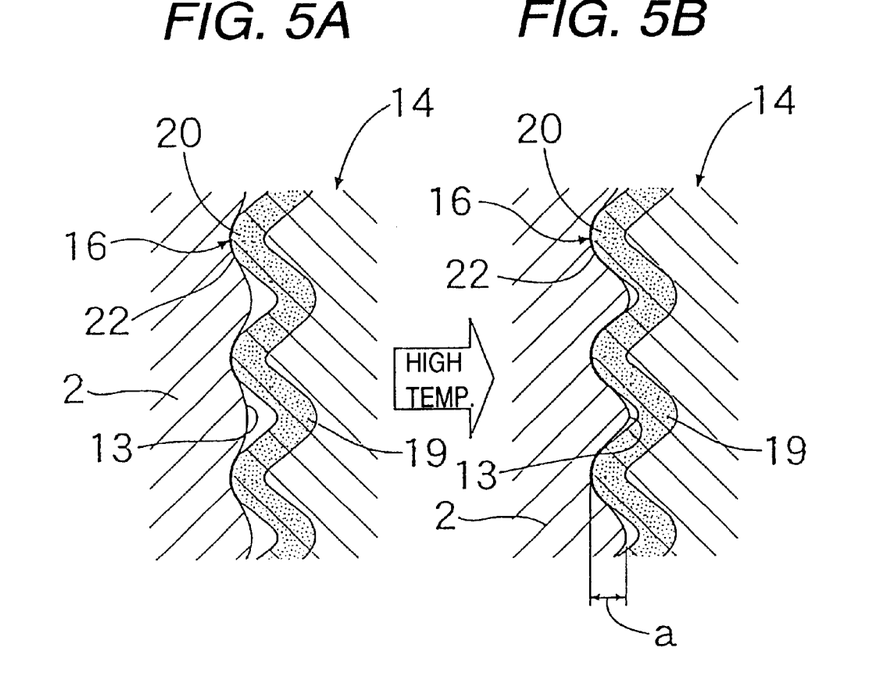
FIGS. 5A and 5B are explanatory diagrams explaining the function of a sealing portion of the first embodiment.
Figure 6A:
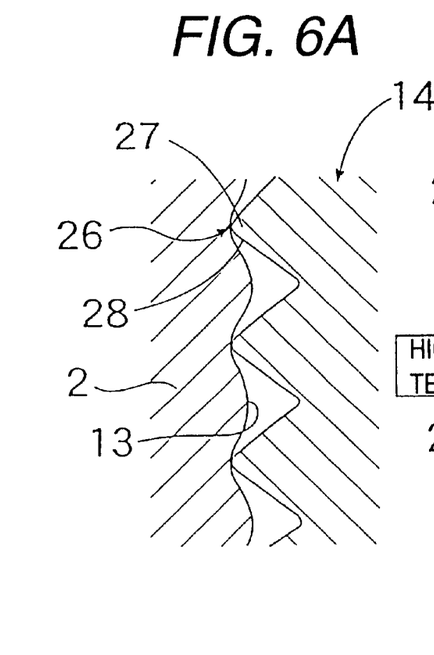
FIGS. 6A and 6B are explanatory diagrams explaining the function of a sealing portion of a comparison example.
Figure 6B:
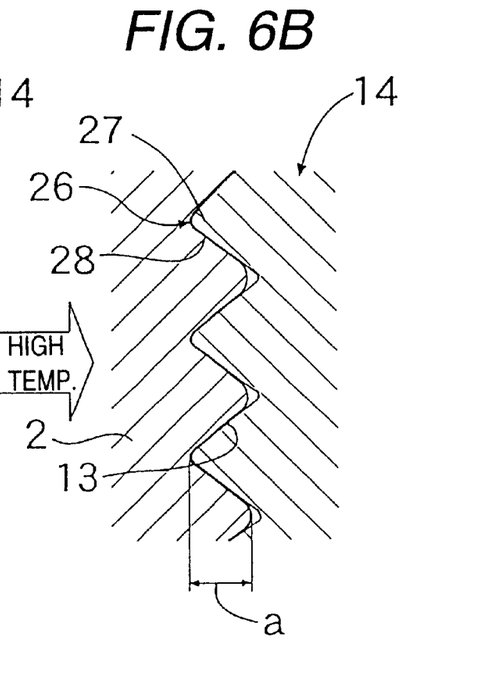

When getting the ridgeline portions 20 of the respective annular sealing projections 16 of the corrosion preventing plate 14 to have the convex arc-shaped contours 22, as is clearly shown in FIG. 5, since the contacting area becomes relatively large due to the biting engagement of the plate, the surface pressure against the peripheral portion 13 of the opening or the like becomes small. Then, when the temperature of the oil pan 1 increases, as clearly shown in FIG. 5, when there are caused an increase in axial force of the plug body 5 and decrease in strength of the peripheral portion 13 of the opening due to the difference in thermal expansion coefficient, the peripheral portion 13 of the opening bites into between adjacent annular sealing projections 16 of the corrosion preventing plate 4, causing a permanent set in fatigue. However, the settling amount of the peripheral portion of the opening then is smaller when compared with a case where ridgeline portions 27 of respective annular sealing projections 26 have acutely angular contours 28 as shown in FIGS. 6A, 6B, in other words, a case where the surface pressure is relatively large, thereby making it possible to suppress the reduction in sealing properties.

Note that in a case where a predetermined operation is performed after opening the drain hole 4, and thereafter the drain hole 4 is closed again, the deformed washer 11 is replaced with a new one. Since there is caused no deformation to the corrosion preventing plate 14, no replacement is required.

Figure 7:
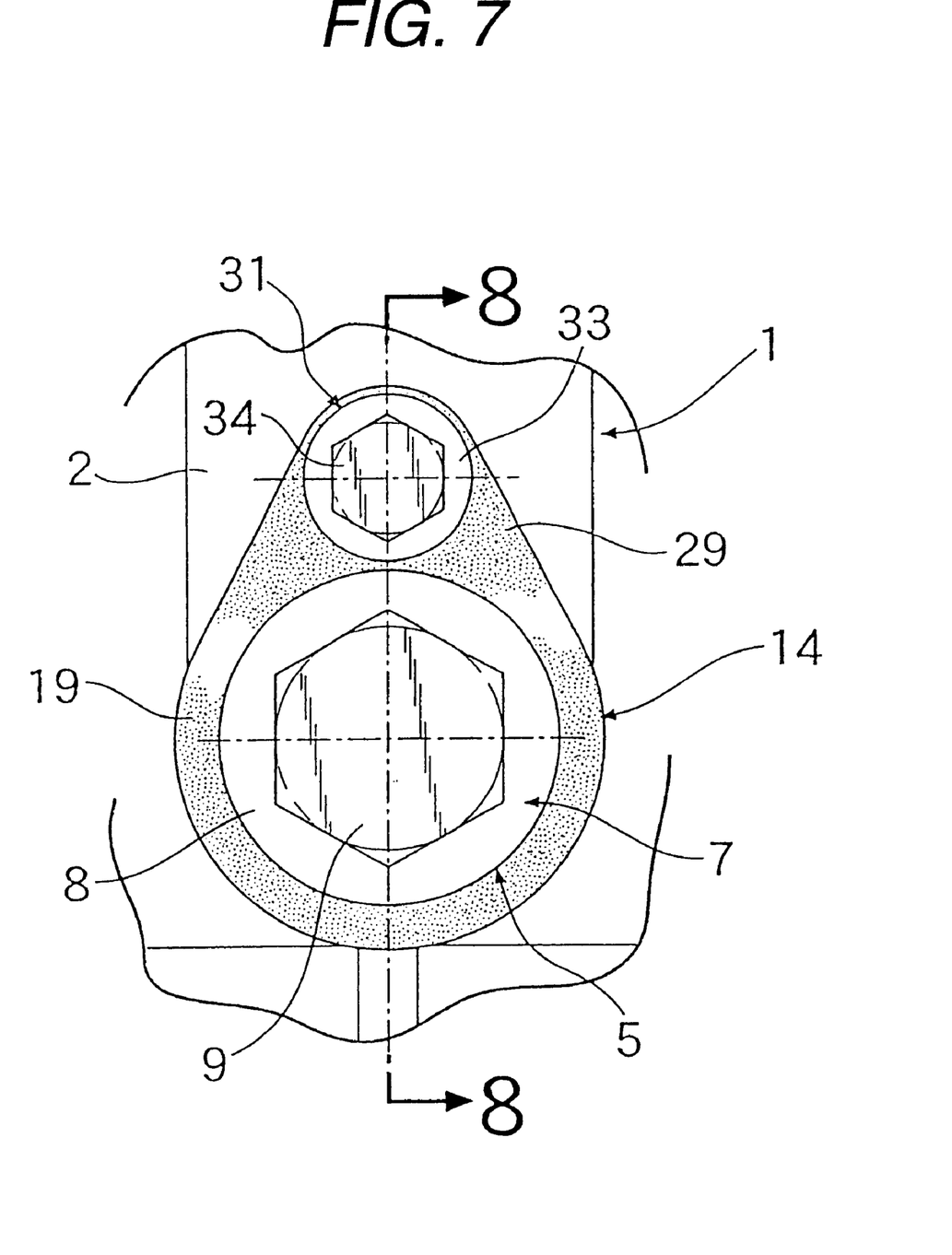
FIG. 7 is a side view showing a main part of a second embodiment.
Figure 8:
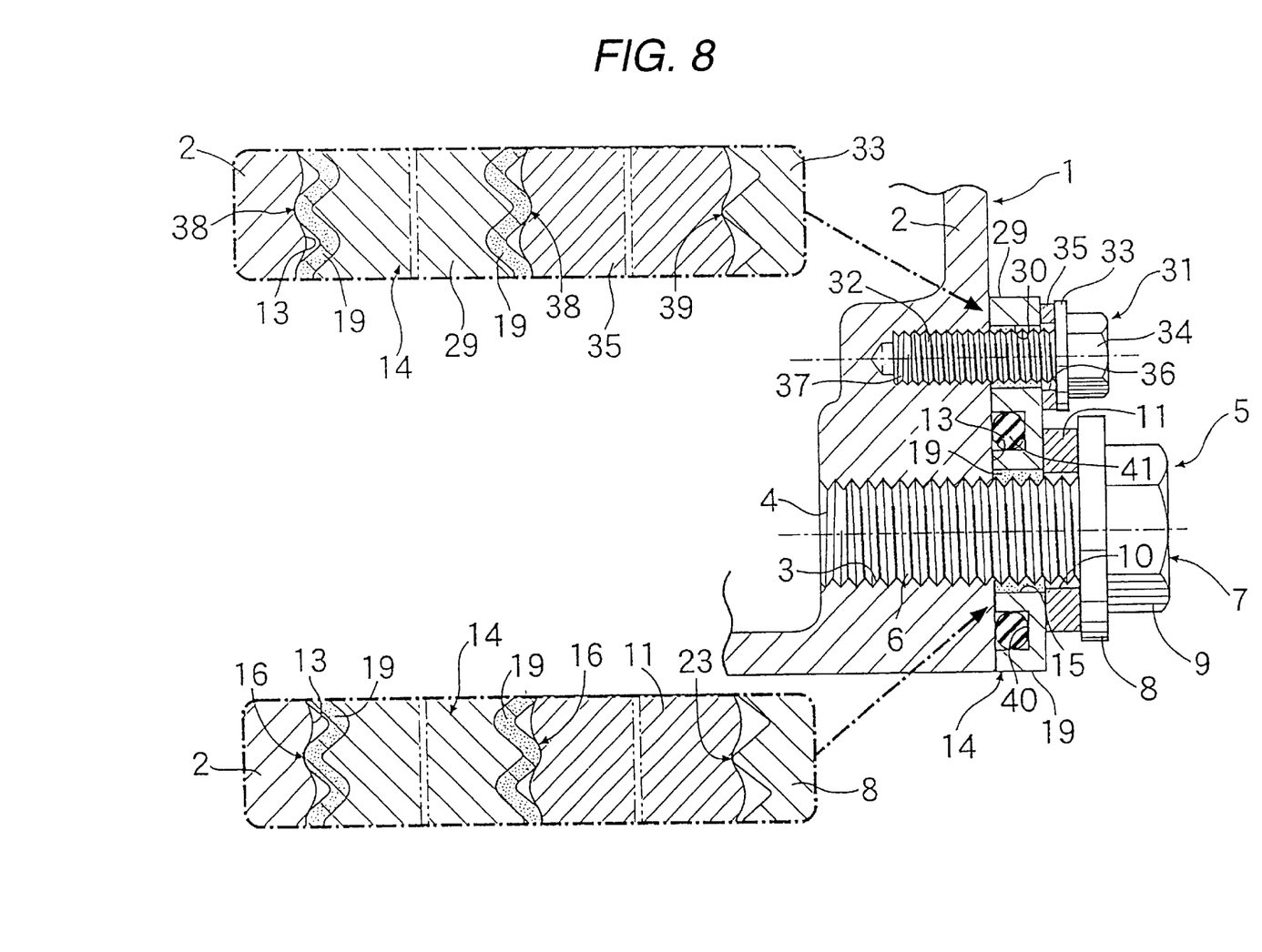
FIG. 8 is a sectional view taken along the line 8—8 of FIG. 7.

In a second embodiment shown in FIGS. 7 and 8, a corrosion preventing plate 14 has a projecting portion 29 which projects radially outwardly, and a threaded shank passing hole 30 is formed in the projecting portion 29.

A machine screw 31 comprises a threaded shank 32 and a hexagonal head 34 which is integral with the threaded shank 32 and has a seat 33. The machine screw 31 is constructed of a steel similar to that of the first embodiment and has a Zn plated coating covering the entire surface thereof. A washer 35 constructed of a soft Al alloy (or pure Al) which is similar to that of the first embodiment is fitted on the threaded shank 32 via a threaded shaft passing hole 36 formed therein, and the threaded shank 32 is screwed into an internally threaded hole 37 present on a side wall 2 of the oil pan 1 via the threaded shaft passing hole 30 in the projecting portion 29, whereby the position of the corrosion preventing plate 14 is effected.

In order to construct a sealing construction similar to previously described sealing construction, a plurality of concentrically arranged annular sealing projections 38, 39 are formed on both sides of the projecting portion 29 around the threaded shaft passing hole 30 and an annular side of the seat 33 facing the washer 35 around the threaded shank 32, respectively, and those annular sealing projections 38, 39 bite into the side wall 2 and the washer 35, respectively.

Additionally, an annular groove 40 surrounding the threaded shank passing hole 15 is provided on the side of the corrosion preventing plate 14 facing the side wall 2, and a sealing ring 41 is mounted in the annular groove 40 with a view to improving the reliability of the sealing construction. In this case, a plurality of annular sealing projections 16 which are similar to those described above are formed at an annular area inwardly of the annular groove 40 on a side of the corrosion preventing plate 14 facing the peripheral portion 13 of the opening in the side wall. The corrosion preventing plate 14 having the projecting portion 29 is constructed of an Al alloy similar to that used in the first embodiment, and a hard anodic oxidation film 19 is formed over the entire surface of the corrosion preventing plate 14 which is imparted a hole sealing treatment and is about 10 $\mu m$. The other features of the construction are the same as those described in the first embodiment.

Figure 9:
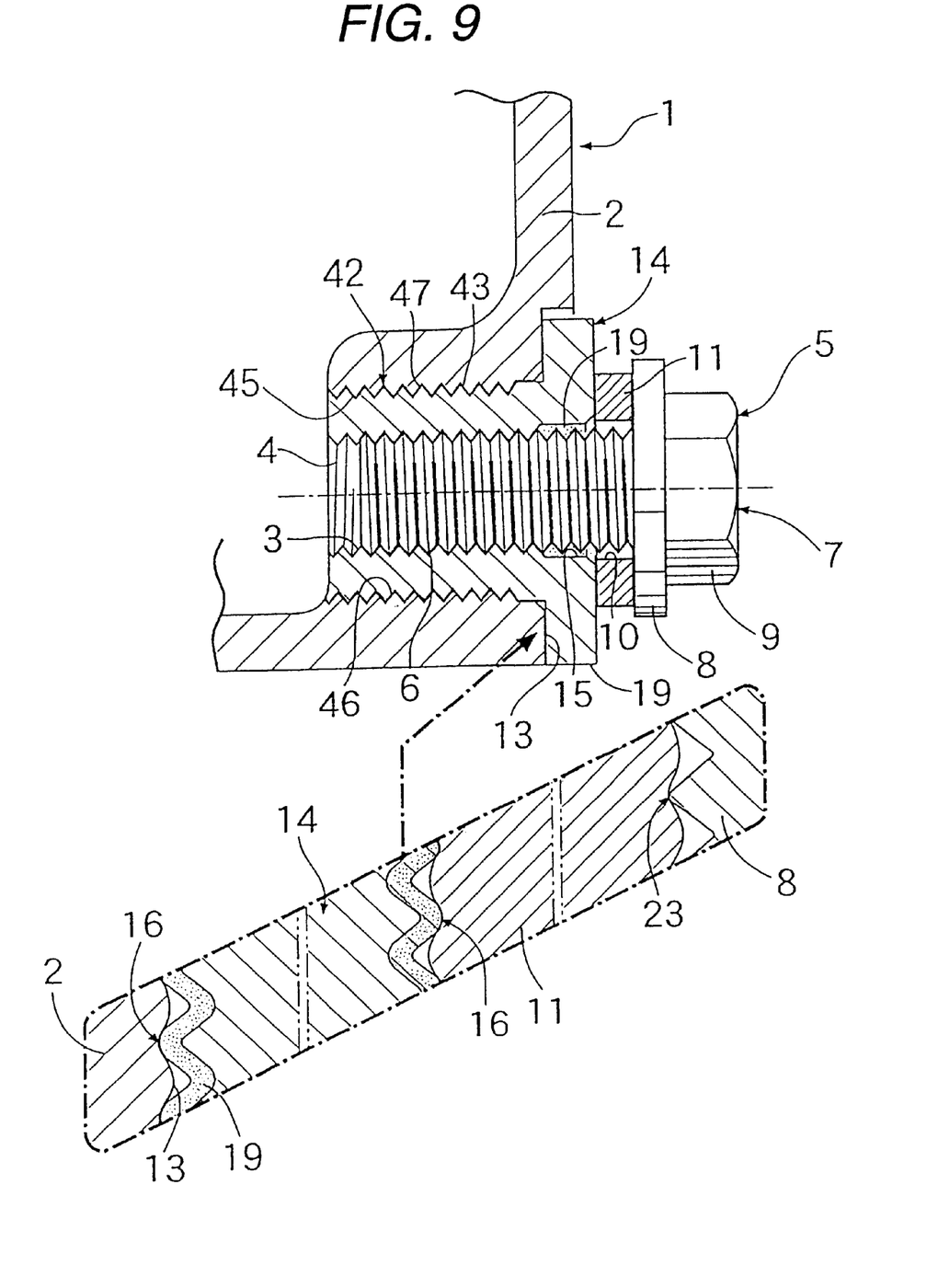
FIG. 9 is a sectional view showing a main part of a third embodiment, which corresponds to FIGS. 2 and 8.

In a third embodiment shown in FIG. 9, a corrosion preventing plate 14 has a threaded cylinder 42 in an annular side thereof facing a side wall 2 of an oil pan 1. The threaded cylinder 42 projects from a portion of the corrosion preventing plate 14 around a threaded shank passing hole 15 in such a manner as to be coaxial with a center line of the passing hole 15. The threaded cylinder 42 has external threads 43 in an outer circumferential surface and internal threads 3 in an inner circumferential surface thereof. The corrosion preventing plate 14 having the threaded cylinder 42 is constructed of an Al alloy similar to that described in the first embodiment, and a hard anodic oxidation film 19 is formed over the entire surface of the corrosion preventing plate 14 which is imparted a hole sealing treatment and is about 10 $\mu m$.

The external threads 43 of the threaded cylinder 42 are screwed into a through hole 46 having internal threads 45 which is formed in the side wall 2 of the oil pan 1 via a sealing agent 47, whereby the inside of the threaded cylinder 42 becomes a drain hole 4 provided with the internal threads 3, and additionally, the other annular side of the corrosion preventing plate 14 abuts against a peripheral portion 13 of an opening of the drain hole 4. A threaded shank 6 of a plug body 5 is screwed into the drain hole 4 as is described above. The features of the construction are the same as those described in the first embodiment.

A pre-coating sealing agent in which an uncured sealing material is sealed in a micro capsule is used as the sealing agent 47, and when this is applied to the external threads 43 of the threaded cylinder 42, the micro capsule is broken while the threaded cylinder 42 is screwed into the through hole 46, and this allows the sealing material to react with the atmosphere so that the sealing material gets cured.

As described above, when the drain hole 4 is constituted by the Al alloy threaded cylinder 42, when compared with a case in which the drain hole 4 is directly formed in the Mg alloy side wall 2, the strength of the internal threads 3 can be improved by the difference in strength of the materials, whereby loosening of the plug body 5 attributed to the buckling or the like of the internal threads 3 can be avoided.

Note that the invention is applied not only to the oil pan but also to a case such as a transmission or the like.

According to the invention, the reduction in weight of the case can be attained by constructing the case of the Mg alloy, and the construction for closing the through hole in the Mg alloy case can be provided in which the corrosion of the peripheral portion of the opening of the through hole in the case can securely be avoided.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A construction for closing a through hole in a Mg alloy case, comprising:

internal threads formed on said through hole in said Mg alloy case;

a screw type plug body engaging with said internal threads and closing said through hole, said plug body being formed of a metal other than Mg and Mg alloy, wherein said plug body has a threaded shank screwed into said through hole and an enlarged end having a diameter greater than that of said threaded shank; and a corrosion protecting plate fitted on said threaded shank via a threaded shank passing hole and disposed between said enlarged end and a peripheral portion of an opening of said through hole, said peripheral portion being confronted with said enlarged end, wherein said corrosion protecting plate electrically insulates said enlarged end and said peripheral portion of the opening, and wherein said corrosion protecting plate has a plurality of annular sealing projections on both sides thereof which are concentrically disposed about said threaded shank passing hole and are bitten into said peripheral portion of the opening and said enlarged end respectively.

2. The construction according to claim 1, wherein the heights of respective annular sealing projections are not less than 5 $\mu$m.

3. The construction according to claim 1, wherein said corrosion protecting plate is made of Al alloy, and an anodic oxidation film is formed over the entire surface thereof.

4. The construction according to claim 3, wherein a ridgeline portion of said respective annular sealing projections has a convex arc-shaped contour at a cross-section thereof which intersects with a ridgeline thereof.

5. The construction according to claim 1, wherein said enlarged end comprises:

a head having a seat; and a washer fitted on the thread shank via a threaded shank passing hole.

6. The construction according to claim 1, wherein said corrosion protecting plate is formed into an annular-shape.

7. The construction according to claim 1, wherein said corrosion protecting plate is formed with an annular groove which is concentrically disposed about said threaded shank passing hole, and a sealing ring is mounted in said annular groove.

8. The construction according to claim 1, wherein said threaded shank of said screw type plug body is directly engaged with said internal threads and closing said through hole.

9. The construction according to claim 1, wherein said screw type plug body is indirectly engaged with said internal threads of said through hole through a threaded cylinder which has outer threads directly engaged with said internal threads formed on said through hole and inner threads directly engaged with said threaded shank of said screw type plug body, wherein said threaded cylinder is integrally formed with said corrosion protecting plate.

* * * * *